US012173667B1

(12) United States Patent
Echarla et al.

(10) Patent No.: US 12,173,667 B1
(45) Date of Patent: Dec. 24, 2024

(54) BLOCK SNAP CHANNEL HAVING MULTI-RADII FILLET PROFILE

(71) Applicant: GM GLOBAL TECHNOLOGY OPERATIONS LLC, Detroit, MI (US)

(72) Inventors: Govindu Echarla, Bangalore (IN); Ramachandra K. Rao, Bangalore (IN); Bala Krishna Sela, Rochester Hills, MI (US); Kevin E. Eckerle, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/408,831

(22) Filed: Jan. 10, 2024

(51) Int. Cl.
*F02B 75/22* (2006.01)
*F02F 7/00* (2006.01)

(52) U.S. Cl.
CPC .................................. *F02F 7/0021* (2013.01)

(58) Field of Classification Search
CPC .................................. F02F 7/0053; F16C 9/02
USPC ...................................................... 123/195 R
See application file for complete search history.

(56) References Cited

U.S. PATENT DOCUMENTS 3,117,498 A * 1/1964 Johnson ................ F02F 7/0012 384/294
5,716,145 A * 2/1998 Eidenbock ........... B23D 31/003 384/434
8,573,177 B2 * 11/2013 Wiebrecht ............ B23D 31/003 29/888.012
11,181,070 B2 * 11/2021 Grebien .................... F16C 9/02

* cited by examiner

*Primary Examiner* — Long T Tran
*Assistant Examiner* — James J Kim
(74) *Attorney, Agent, or Firm* — Lorenz & Kopf LLP

(57) ABSTRACT

A number of variations which may include a product including a combustion engine cylinder block having a first snap channel having first multi-radii fillet profile, and methods of making the same.

11 Claims, 5 Drawing Sheets

BLOCK SNAP CHANNEL HAVING MULTI-RADII FILLET PROFILE

INTRODUCTION

The technical field generally relates to engine cylinder blocks and methods of making and using the same.

BACKGROUND

Vehicles may include an engine cylinder block having a snap channel. However, in some situations such engine cylinder block may fatigue in the area of the snap channel.

Accordingly, it may be desirable to provide an engine cylinder block with improved fatigue performance in the area of a snap channel, and methods of making and using the same.

SUMMARY

The following description of variants is only illustrative of components, elements, acts, products, and methods considered to be within the scope of the disclosure and are not in any way intended to limit such scope by what is specifically disclosed or not expressly set forth. The components, elements, acts, products, and methods as described herein may be combined and rearranged other than as expressly described herein and still are considered to be within the scope of the disclose.

Variation 1 may include a product including a combustion engine cylinder block having a first snap channel having first multi-radii fillet profile.

Variation 2 may include the product as set forth in Variation 1 wherein the first multi-radii fillet profile comprises a first machined fillet profile having a first radius and a second machined fillet having a second radius, wherein the first radius and second radius are not the same.

Variation 3 may include the product as set forth in Variations 1-2 wherein the first radius is equal to or greater than the second radius.

Variation 4 may include the product as set forth in Variations 1-2 further comprising a third machined fillet profile having third radius which is different than at least one of the first radius and second radius.

Variation 5 may include the product as set forth in Variation 4 wherein the first radius is great than or less than at least one of the second radius or third radius, the second radius is great than or less than at least one of the first radius or third radius, and the third radius is equal to, greater than or less than at least one of the first radius or second radius.

Variation 6 may include the product as set forth in Variation 1 further comprising a second snap channel having a second multi-radii fillet profile.

Variation 7 may include the product as set forth in Variation 6 wherein the second multi-radii fillet profile comprises a fourth machined fillet profile having a fourth radius and a fifth machined fillet having a fifth radius, wherein the fourth radius and fifth radius are not the same.

Variation 8 may include the product as set forth in Variation 7 wherein the second multi-radii profile comprises a fourth machined fillet profile having a fourth radius, a fifth machined fillet profile, and a sixth machined fillet profile, wherein the fourth radius is great than or less than at least one of the fifth radius or sixth radius, the fifth radius is great than or less than at least one of the fourth radius or sixth radius, and the sixth radius is equal to, greater than or less than at least one of the fourth radius or fifth radius.

Variation 9 may include the product as set forth in Variation 1 further comprising a bearing cap attached to the combustion engine cylinder block, the combustion engine cylinder block including a first cavity for receiving a piston and a second cavity for receiving a portion of a crankshaft, the bearing cap having a third cavity formed therein for receiving a portion of the crankshaft, the third cavity being defined by a semicircular, in cross-section, surface, the combustion engine block having a first recess formed therein for receiving a portion of a bearing assembly, the bearing cap having a second recess formed therein for receiving a portion of the bearing assembly.

Variation 10 may include the product as set forth in Variation 9 combustion engine cylinder block having a first bearing cap engagement surface extending outwardly from a first end of the semicircular surface of the combustion engine cylinder block and a second bearing cap engagement surface extending from an opposite end of a semicircular surface of the combustion engine block, a first wall extending downwardly from the first bearing cap engagement surface and a second side wall extending downwardly from the second bearing cap engagement surface.

Variation 11 may include the product as set forth in Variation 10 wherein the bearing cap includes a first combustion engine cylinder block engagement surface extending outwardly from a first end of a second semicircular, in cross-section, surface for receiving a portion of the crankshaft, and a second combustion engine block engagement surface extending outwardly from a second end of the second semicircular, and cross-section, surface for receiving a portion of the crankshaft, and a first side wall extending downwardly from the first combustion engine cylinder block engagement surface and a second side wall extending down away from the second combustion engine cylinder block engagement surface.

Variation 12 may include a method including performing thermal and structural analysis of a combustion engine block in the area where a first snap channel is to be formed therein; determining if there is at least one of a first or low stress area and at least one of a second or high stress area wherein the first snap channel is to be formed; machining a snap channel in the combustion engine cylinder block so that the at least one of a first or low stress area has a first machined fillet profile having a first radius and so that the at least one of a second or high stress area has a second machined fillet profile has a second radius, wherein the second radius is equal to or greater than the first radius.

Variation 13 may include a method as set forth in Variation 12 further comprising machining a third fillet profile having third radius which is different than at least one of the first radius and second radius.

Variation 14 may include a method as set forth in Variations 13 wherein the first radius is great than or less than at least one of the second radius or third radius, the second radius is great than or less than at least one of the first radius or third radius, and the third radius is equal to, greater than or less than at least one of the first radius or second radius.

Variation 15 may include a method as set forth in Variation 12 further comprising performing thermal and structural analysis of a combustion engine cylinder block in the area where a second snap channel is to be formed therein; determining if there is at least one of a fourth or low stress area and at least one of a fifth or high stress area where the second snap channel is to be formed; machining a second snap channel in the combustion engine cylinder block so that the at least one of a fourth or low stress area has a fourth machined fillet profile having a fourth radius and so that the at least one of a fifth or high stress area has a fifth machined fillet profile wherein the fifth radius is equal to or greater than the fourth radius.

Variation 16 may include a method as set forth in Variation 15 further comprising machining a sixth machined fillet profile having sixth radius, wherein the fourth radius is great than or less than at least one of the fifth radius or sixth radius, the fifth radius is great than or less than at least one of the fourth radius or sixth radius, and the sixth radius is equal to, greater than or less than at least one of the fourth radius or sixth radius.

Variation 17 may include a method as set forth in Variations 15-16 further comprising attaching a bearing cap to the combustion engine cylinder block, the combustion engine cylinder block including a first cavity for receiving a piston and a second cavity for receiving a portion of a crankshaft, the bearing cap having third cavity formed therein for receiving a portion of the crankshaft, the third cavity being defined by a semicircular, in cross-section, surface, the combustion engine block having a first recess formed therein for receiving a portion of the bearing assembly, the bearing cap having a second recess formed therein for receiving a portion of the bearing assembly.

Variation 18 may include a method as set forth in Variation 17 combustion engine cylinder block having a first bearing cap engagement surface extending outwardly from a first end of the semicircular surface of the combustion engine cylinder block and a second bearing cap engagement surface extending from an opposite end of a semicircular surface of the combustion engine block, a first wall extending downwardly from the first bearing cap engagement surface and a second side wall extending downwardly from the second bearing cap engagement surface.

Variation 19 may include a method as set forth in Variation 18 wherein the bearing cap includes a first combustion engine cylinder block engagement surface extending outwardly from a first end of a second semicircular, in cross-section, surface for receiving a portion of the crankshaft, and a second combustion engine block engagement surface extending outwardly from a second end of the second semicircular, and cross-section, surface for receiving a portion of the crankshaft, and a first side wall extending downwardly from the first combustion engine cylinder block engagement surface and a second side wall extending down away from the second combustion engine cylinder block engagement surface.

Variation 20 may include a method including machining a snap channel in a combustion engine cylinder block to form at least a first machined fillet profile that has a first radius and a second machined fillet profile that has a second radius that is equal to or greater than the first radius.

BRIEF DESCRIPTION OF THE DRAWINGS

The variations will hereinafter be described in conjunction with the following drawing figures, wherein like numerals denote like elements, and wherein.

DETAILED DESCRIPTION

The following detailed description is merely illustrative in nature and is not intended to limit the application and uses. Furthermore, there is no intention to be bound by any expressed or implied theory presented in the preceding technical field, background, summary, or the following detailed description.

Figure 1:
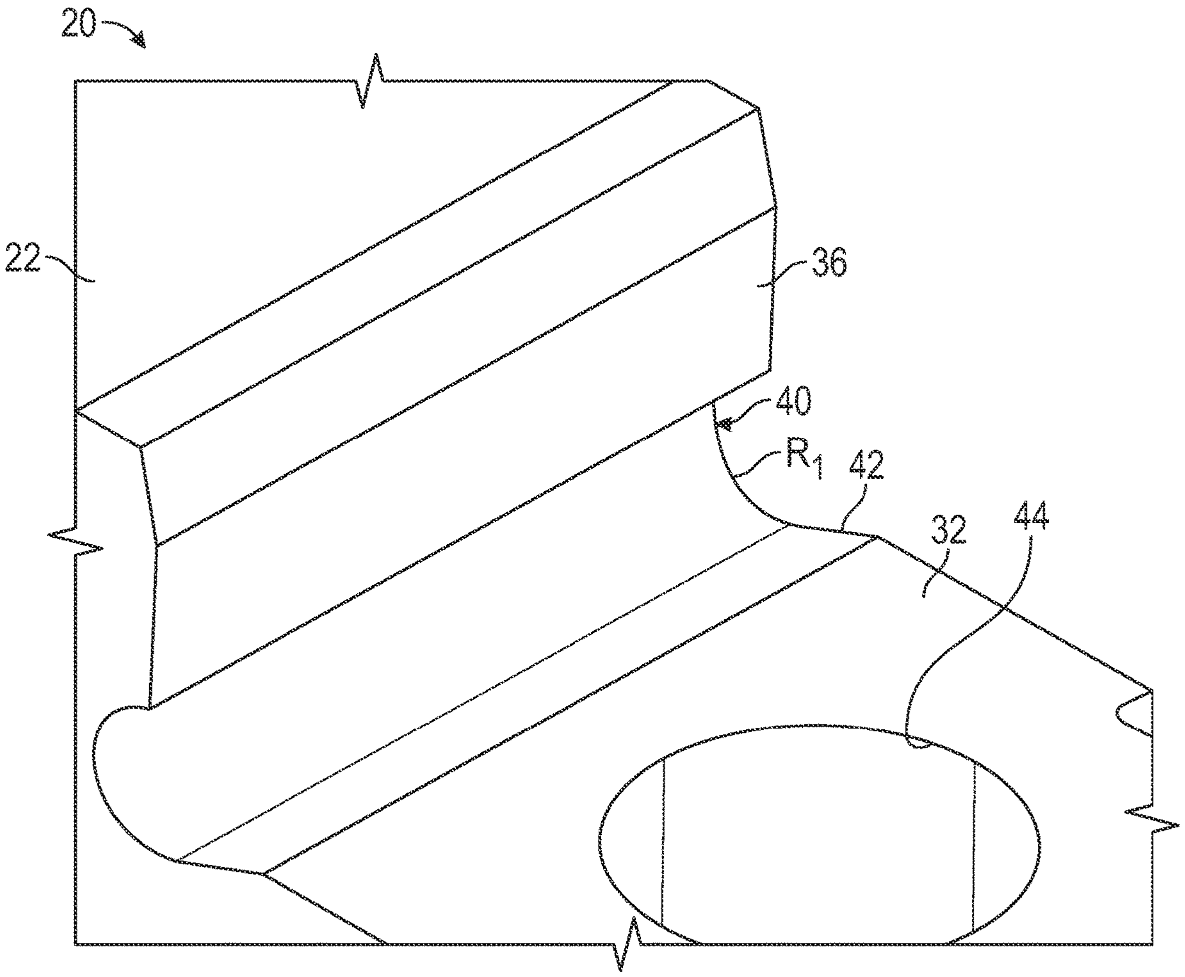
FIG. 1 is a partial, perspective view of a portion of a combustion engine cylinder block according to a number of variations.

FIG. 1 illustrates a number of variations which may include a product 20 including a combustion engine cylinder block 22, which may include a bearing cap engagement surface 32 and a side wall 36. A snap channel 40 may be machined in the combustion engine cylinder block 22 between the bearing cap engagement surface 32 and the side wall 36. A chamfer surface 42 may be provided between the snap channel 40 and the bearing cap engagement surface 32. The snap channel 40 may have a surface coincided with a continuous radius R1. A first bolt hole 44 may be formed in the bearing cap engagement surface 32 to attach a bearing cap to the combustion engine cylinder block 22.

Figure 2:
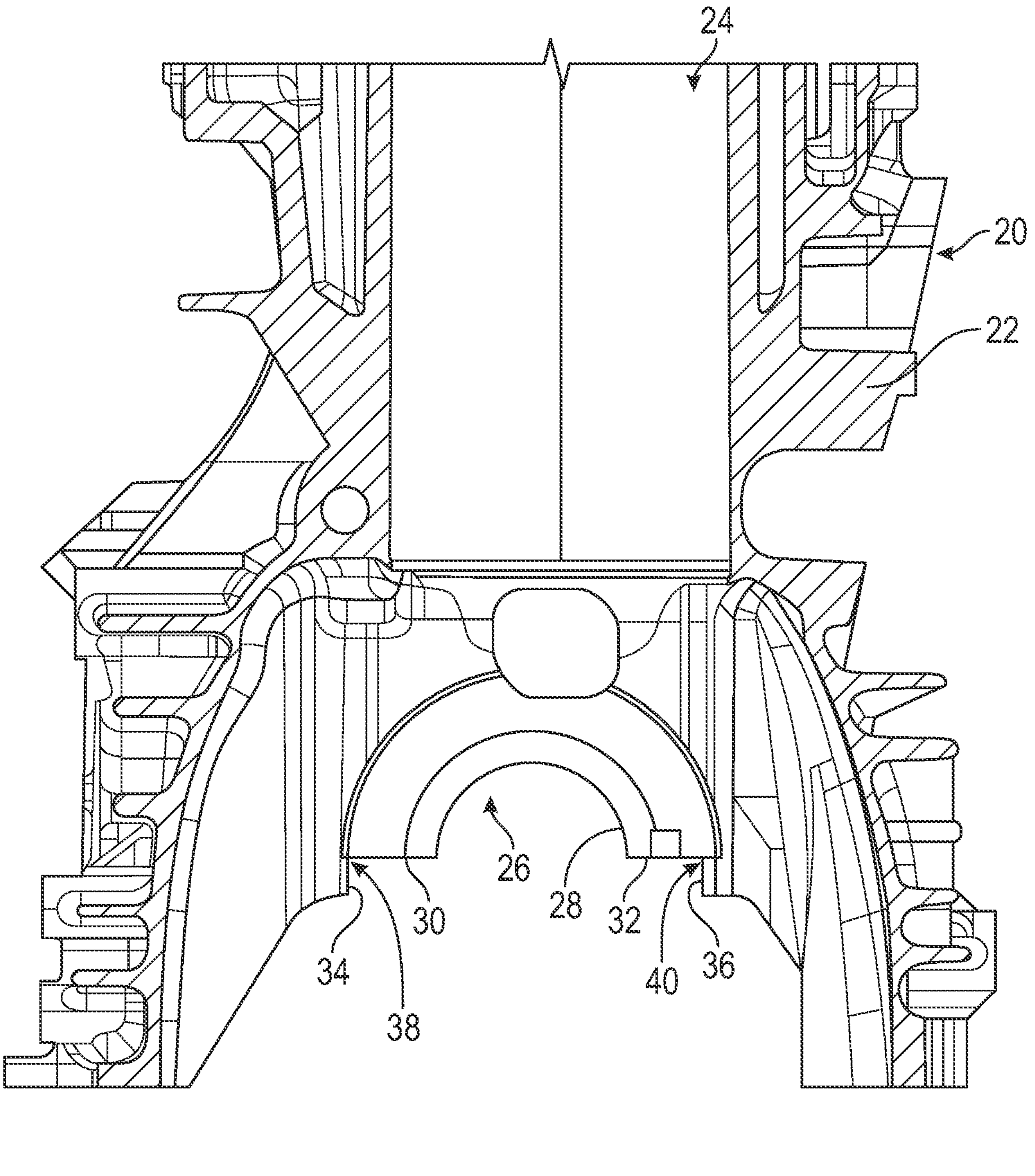
FIG. 2 is a sectional view of a combustion engine cylinder block having two snap channels according to a number of variations.

FIG. 2 illustrates a number of variations which may include a product 20 including a combustion engine cylinder block 22, which may include a first cavity 24 for receiving a piston and a second cavity 26 for receiving a portion of a crankshaft. The second cavity 26 for receiving a portion of a crankshaft may be defined by a semicircular, in cross-section, surface 28. A first bearing cap engagement surface 30 may extend outwardly from one end of the semicircular surface 28 and a second bearing cap engagement surface 32 may extend from an opposite end of the semicircular surface 28. A first side wall 34 may extend downwardly from the first bearing cap engagement surface 30 and a second side wall 36 may extend downwardly from the second bearing cap engagement surface 32. A first snap channel 38 may be machined in the combustion engine cylinder block 22 at the location between the first bearing cap engagement surface 30 and the first side wall 34. A second snap channel 40 may be machined and the combustion engine cylinder block 22 at a location between the second bearing cap engagement surface 32 and the second side wall 36.

Figure 3:
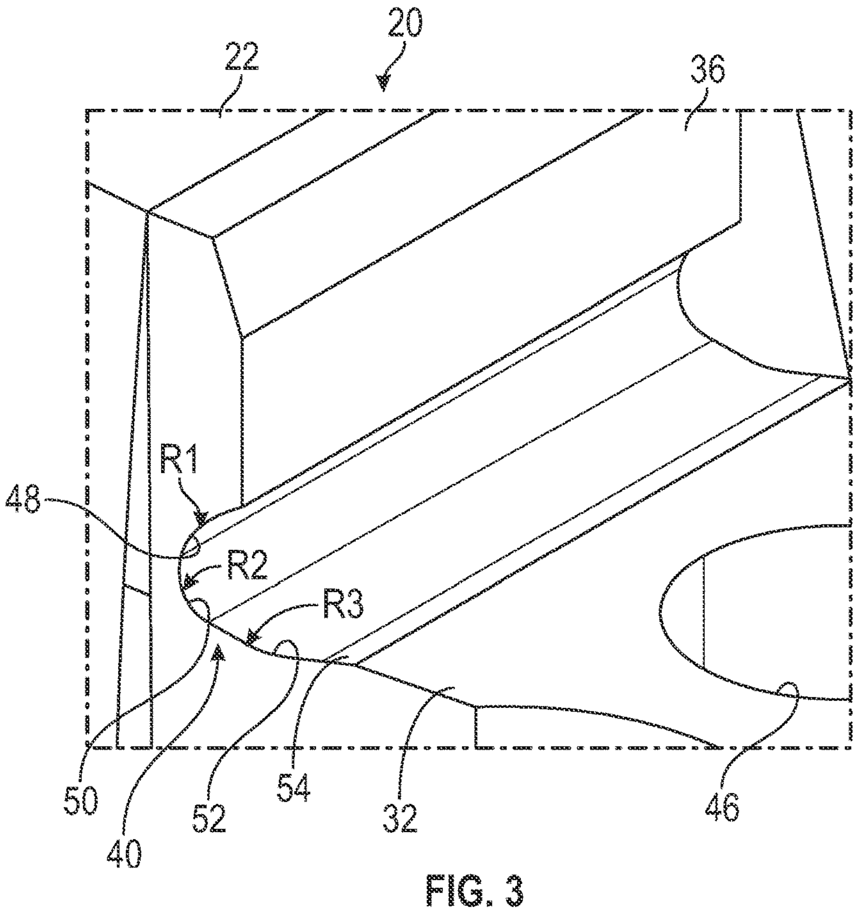
FIG. 3 is a partial, perspective view of a portion of a combustion engine cylinder block according to a number of variations.
Figure 4:
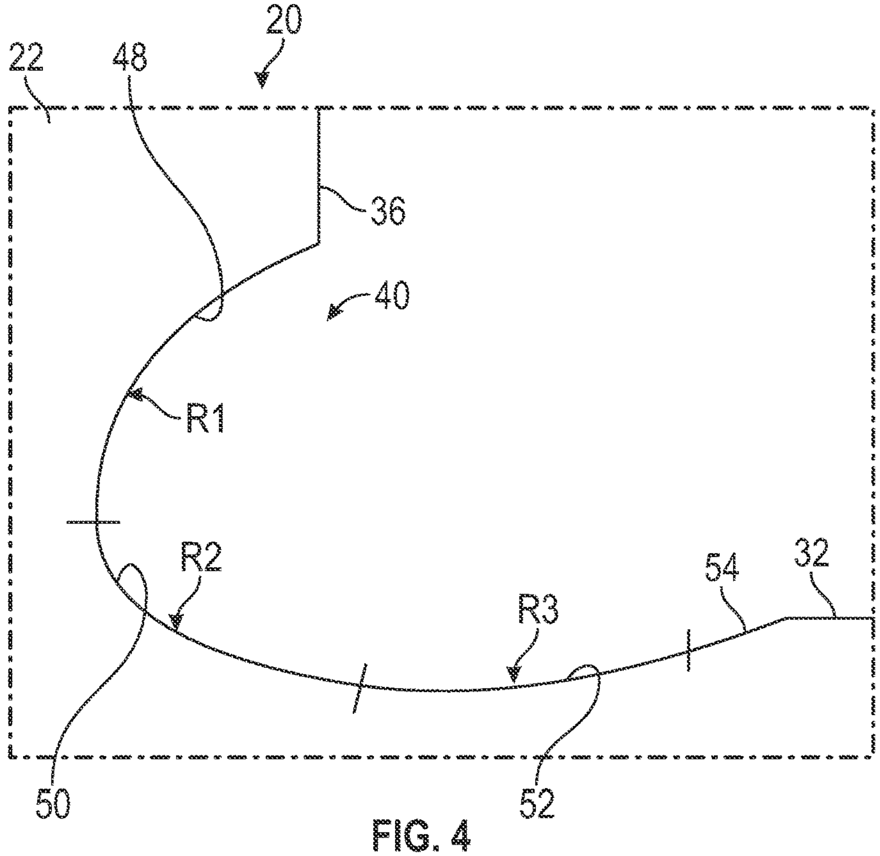
FIG. 4 is a schematic illustration of a combustion engine cylinder block having a snap channel having multi-radii fillet profile according to a number of variations.

FIG. 3 illustrates a number of variations which may include a combustion engine cylinder block 22 having snap channels 38, 40 including a machined surface profile having a plurality concave surfaces, which may include at least a first machined fillet surface 48 and a second machined fillet surface 50. In a number of variations, a third machined fillet surface 52 may also be machined into the combustion engine cylinder block 22. In a number of variations, the first machined fillet surface 48 may coincide with a first radius R1 and the second machined fillet surface 50 may coincide with or have a profile having a second radius R2, wherein R1 and R2 are not the same length. In a number of variations, the third machined fillet surface 52 may coincide with or have a profile having a third radius R3, wherein R1, R2 and R3 are not the same length. In a number of variations, thermal and structural analysis may be performed with respect to the area of the first snap channel 38 and second snap channel 40 to determine areas of low stress and high stress. In a number of variations, the surfaces defining the first snap channel 38 and the second snap channel 40 are machine so that the radius in a high stress area is greater than the radius in a lower stressed area. For example, referring to FIGS. 3 and 4, R3 may have a radius of 5.75 mm. R1 may have a radius of 2.3 mm, and are R2 may have a radius of 1.25 mm, wherein the third machined fillet surface 52 has the first or highest stress area, the first machined fillet surface 48 has a second stress area less than the stress in the area of the third machined fillet surface 52, and the second machined fillet surface 50 has a stress less than the stress in the area of the first machined fillet surface 48. A number of variations may include a product including combustion engine cylinder block 22 having a snap channel 40 having multi-radii fillet profile.

Figure 5:
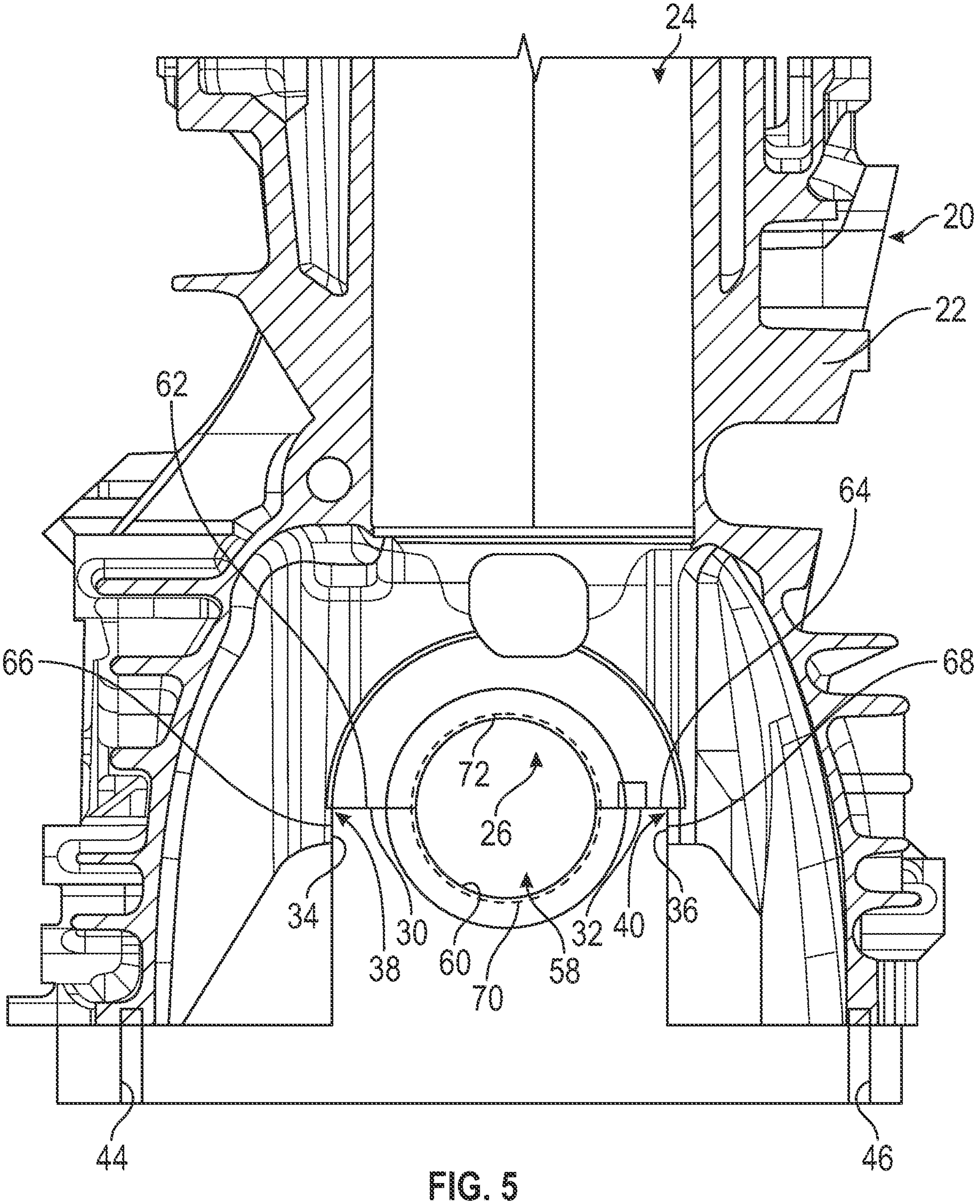
FIG. 5 is a sectional view of a product including a combustion engine cylinder block having to snap channels and a bearing cap attached to the block according to a number of variations.

FIG. 5 illustrates a number of variations which may include a product 20 including a combustion engine cylinder block 22 and a bearing cap 56. The bearing cap 56 may include a first bolt hole 44 and a second bold hole 46 for securing the bearing cap 56 to the combustion engine cylinder block 22. The bearing cap 56 may have a third cavity 58 formed therein for receiving a portion of the crankshaft. The third cavity 58 may be defined by a semi-circular, in cross-section, surface 60. The combustion engine cylinder block 22 may have a first recess 72 formed therein for receiving a portion of a bearing assembly (not shown) and the bearing cap 56 may have a second recess 70 formed therein for receiving a portion of the bearing assembly. The bearing cap 56 may include a first combustion engine cylinder block engagement surface 62 for engaging the first bearing cap engagement surface 30, and a second combustion engine cylinder block engagement surface 64 for engaging the second bearing cap engagement surface 32. The bearing cap 56 may also include a first sidewall 66 extending downwardly from the first combustion engine cylinder block engagement surface 62, wherein the first sidewall 66 may engage the first side wall 34 of the combustion engine cylinder block 22. The bearing cap 56 may also include a second sidewall 68 extending downward from the second combustion engine cylinder block engagement surface 64 and may engage the second side wall 36 of the combustion engine cylinder block 22.

Figure 6:
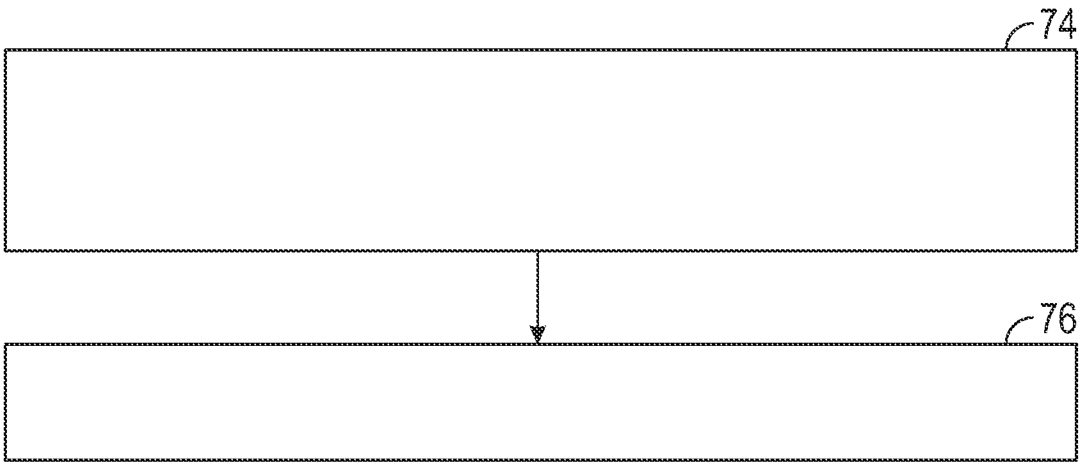
FIG. 6 is a flow chart of a method according to a number of variations.

FIG. 6 illustrates a number of variations which may include a method including machining a snap channel in a combustion engine cylinder block to form at least a first machined fillet profile that has a first radius and a second machined fillet profile has a second radius that is equal to or greater than the first radius 74; and optionally, machining third fillet profile having third radius which is equal to or greater than the second radius 76. Where there are two fillet profiles and the radii are equal to each other the two fillet profiles are spaced apart from each other.

Figure 7:
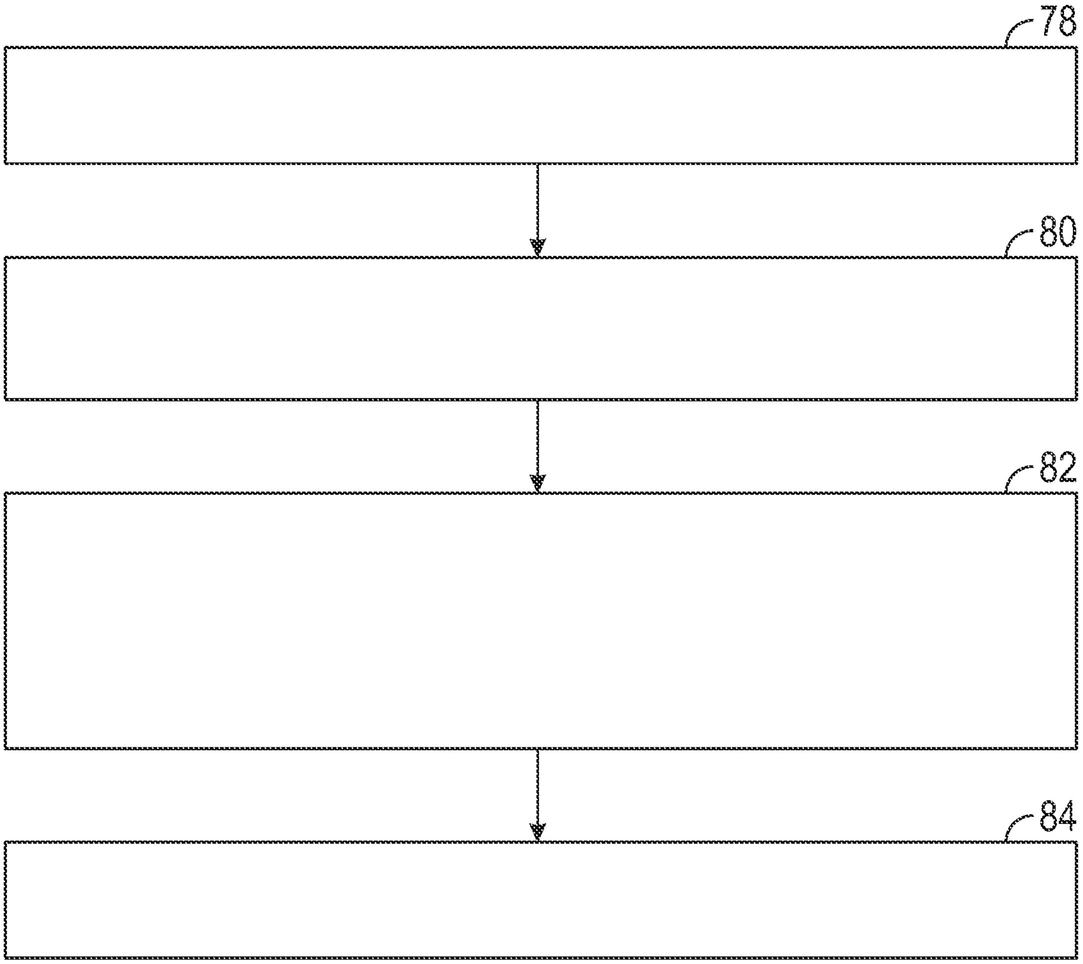
FIG. 7 is a flow chart of a method according to a number of variations.

FIG. 7 illustrates a number of variations which may include a method which may include a performing thermal and structural analysis of a combustion engine cylinder block in the area of a snap channel to be formed therein 78; determining if there is at least one of a first or low stress area and at least one of a second or high stress area where the snap channel is to be formed 80; and machining a snap channel in the combustion engine cylinder block so that the at least one of a first or low stress area has a first machined fillet profile having a first radius and so that the at least one of a second or higher stress area has a second machined fillet profile with a second radius that is equal to or greater than the first radius 82; and optionally, machining third machined fillet profile with third radius that is equal to or greater than the second radius 84.

While at least one illustrative variation has been presented in the foregoing detailed description, it should be appreciated that a vast number of variations exist. It should also be appreciated that the variations are only examples, and are not intended to limit the scope, applicability, or configuration of the disclosure in any way. Rather, the foregoing detailed description will provide those skilled in the art with a convenient road map for implementing the variations. It should be understood that various changes can be made in the function and arrangement of elements without departing from the scope of the disclosure as set forth in the appended claims and the legal equivalents thereof.

What is claimed is:

1. A product comprising:

a combustion engine cylinder block having a first snap channel having a first multi-radii fillet profile, the combustion engine cylinder block defining a first cavity for receiving a piston and a second cavity for receiving a portion of a crankshaft, the second cavity for receiving a portion of a crankshaft defined by a semicircular, in cross-section, surface, the combustion engine cylinder block further comprising a first bearing cap engagement surface extending outwardly from a first end of the semicircular, a first side wall extending downwardly from the first bearing cap engagement surface, wherein the first snap channel having the first multi-radii fillet profile is machined in the combustion engine cylinder block at a location between the first bearing cap engagement surface and the first side wall.

2. The product as set forth in claim 1 wherein the first multi-radii fillet profile comprises a first machined fillet profile having a first radius and a second machined fillet having a second radius, wherein the first radius and the second radius are not equal.

3. The product is set forth in claim 2 wherein the first radius is equal to or greater than the second radius.

4. The product is set forth in claim 2 further comprising a third machined fillet profile having a third radius which is different than at least one of the first radius and the second radius.

5. The product is set forth in claim 2 wherein the first radius is equal to, great than or less than at least one of the second radius or third radius, the second radius is equal, great than or less than at least one of the first radius or the third radius, and the third radius is equal to, greater than, or less than at least one of the first radius or the second radius.

6. The product as set forth in claim 1 further comprising a second snap channel having a second multi-radii fillet profile, the combustion engine cylinder block further comprising a second bearing cap engagement surface extending outwardly from a second end of the semicircular, a second side wall extending downwardly from the second bearing cap engagement surface, wherein the second snap channel has a second multi-radii fillet profile is machined in the combustion engine cylinder block at a second location between the second bearing cap engagement surface and the first side wall.

7. The product as set forth in claim 6 wherein the second multi-radii fillet profile comprises a fourth machined fillet profile having a fourth radius and a fifth machined fillet having a fifth radius, wherein the fourth radius and the fifth radius are not equal.

8. The product is set forth in claim 6 wherein the second multi-radii fillet profile comprises a fourth machined fillet profile having a fourth radius, a fifth machined fillet profile having a fifth radius, and a sixth machined fillet profile having a sixth radius, wherein the fourth radius is equal to, great than or less than at least one of the fifth radius or the sixth radius, the fifth radius is great than or less than at least one of the fourth radius or the sixth radius, and the sixth radius is equal to or greater than or less than at least one of the fourth radius or the fifth radius.

9. The product as set forth in claim 1 further comprising a bearing cap attached to the combustion engine cylinder block, the bearing cap having a third cavity formed therein for receiving a portion of the crankshaft, the third cavity being defined by a semicircular, in cross-section, surface, the combustion engine cylinder block having a first recess formed therein for receiving a portion of a bearing assembly, the bearing cap having a second recess formed therein for receiving a portion of the bearing assembly.

10. The product as set forth in claim 9 wherein the first snap channel having the first multi-radii fillet profile includes a first machined fillet surface in a first area of the combustion engine cylinder block having a first stress level and a second machined fillet surface in a second area of the combustion engine cylinder block having a second stress level, and wherein the first machined fillet surface has a first radius and the second machined fillet surface has a second radius, the first stress level being great than the second stress level, and the first radius being greater than the second radius.

11. The product is set forth in claim 10 wherein the bearing cap includes a first combustion engine cylinder block engagement surface extending outwardly from a first end of a second semicircular, in cross-section, surface for receiving a portion of the crankshaft, and a second combustion engine cylinder block engagement surface extending outwardly from a second end of the second semicircular, in cross-section, surface for receiving a portion of the crankshaft, and a first side wall extending downwardly from the first combustion engine cylinder block engagement surface and a second side wall extending down away from the second combustion engine cylinder block engagement surface.

* * * * *